(12) United States Patent
Itoh et al.

(10) Patent No.: US 6,823,196 B1
(45) Date of Patent: Nov. 23, 2004

(54) MULTI-MODE COMMUNICATION APPARATUS AND METHOD INCLUDING MULTIPLE TRANSMITTER SECTIONS

(75) Inventors: Taizoh Itoh, Kawasaki (JP); Yoshitsugu Moriwaki, Higashihiroshima (JP); Yoshiro Nakano, Higashihiroshima (JP); Kenji Edo, Higashihiroshima (JP); Takashi Maemura, Higashihiroshima (JP); Kouji Tashima, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/545,001

(22) Filed: Apr. 6, 2000

(30) Foreign Application Priority Data

Apr. 7, 1999 (JP) .......................................... 11-099516

(51) Int. Cl.[7] .............................. H04M 1/00; H04B 1/02
(52) U.S. Cl. ................................ 455/553.1; 455/556.1; 455/83; 455/103; 455/552.1
(58) Field of Search .................................. 455/426, 555, 455/553, 556, 557, 466, 82–83, 78, 103, 515, 552, 553.1, 556.1, 426.1, 552.1, 575.7, 90.2, 129

(56) References Cited

U.S. PATENT DOCUMENTS

| | | | | |
|---|---|---|---|---|
| 5,463,674 A | * | 10/1995 | Gillig et al. ............. | 455/552.1 |
| 5,924,044 A | * | 7/1999 | Vannatta et al. ............ | 455/556 |
| 6,128,476 A | * | 10/2000 | Fujita ......................... | 455/103 |
| 6,138,010 A | * | 10/2000 | Rabe et al. ................. | 455/426 |
| 6,317,607 B1 | * | 11/2001 | Tomcik et al. .............. | 455/552 |
| 6,480,476 B1 | * | 11/2002 | Willars ....................... | 370/311 |
| 6,751,470 B1 | * | 6/2004 | Ella et al. .................... | 455/86 |

FOREIGN PATENT DOCUMENTS

| | | |
|---|---|---|
| EP | 0 780 993 A | 6/1997 |
| GB | 2 327 016 A | 1/1999 |
| JP | 10-336757 A | 12/1998 |

* cited by examiner

Primary Examiner—Jean Gelin
Assistant Examiner—Eliseo Ramos-Feliciano
(74) Attorney, Agent, or Firm—Nixon & Vanderhye P.C.

(57) ABSTRACT

There is provided a communication apparatus including a plurality of radio transmitter sections, which is capable of suppressing unnecessary radiowaves from being generated due to mutual modulation distortion without increasing the size and weight of the whole apparatus. When the communication apparatus receives a signal from a radio base station and it coincides with the ID of a station when one transmitter section is operative, it rejects a process for the incoming call request. Therefore, no transmission is made simultaneously by the different radio transmitter sections, and the quality of the radiowaves transmitted may be kept high.

14 Claims, 8 Drawing Sheets

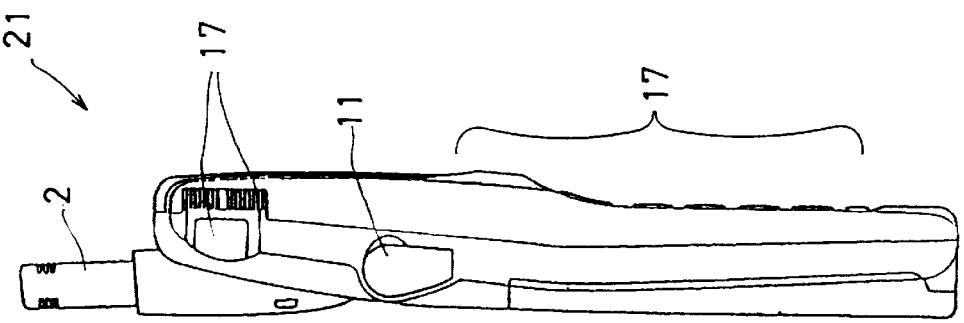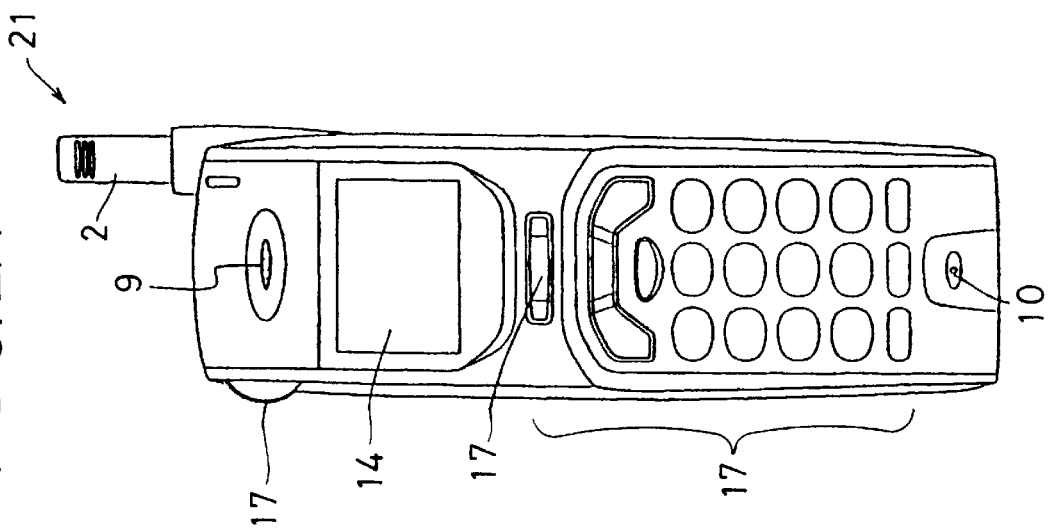

FIG. 3A

| STORAGE AREA NAME | CONTENTS OF STORAGE (BEFORE TRANSITION OF TEXT) |
|---|---|
| CURRENT STATE | A: WAITING |
| OPERATIONAL REQUEST | 6: CALL INCOMING IN PDC |

FIG. 3B

| STORAGE AREA NAME | CONTENTS OF STORAGE (AFTER TRANSITION OF TEXT) |
|---|---|
| CURRENT STATE | I: IN PDC COMMUNICATION |
| OPERATIONAL REQUEST | NONE |

FIG. 5

| CURRENT STATE OPERATIONAL REQUEST | CONTENTS OF PROCESS |
|---|---|
| | |
| | |
| A-6 | EXECUTE PDC CALL INCOMING FLOW |
| | |
| | |
| B-6, C-6 D-6, E-6 | REJECT, RECEIVING INFORMATION: PDC CALL INCOMING, DESTINATION NUMBER |
| | |
| D-7 | EXECUTE PDC CALL ORIGINATING FLOW |
| | |
| E-8 | EXECUTE PHS TERMINATION PROCESSING FLOW |
| | |
| F-3, G-3 H-3, I-3 | REJECT, RECEIVING INFORMATION = PHS CALL INCOMING |
| | |
| B-4, C-4 D-4, E-4 | REJECT |
| | |
| F-1, G-1 H-1, I-1 | REJECT |

FIG. 7A

NETWORK -> USER (PCH)

| INFORMATION ELEMENT | DIRECTION | TYPE | INFORMATION LENGTH | REMARKS |
|---|---|---|---|---|
| MESSAGE TYPE | DOWN | M | 1 | |
| LENGTH OF BCCH RECEIVING SECTION | DOWN | M | 1 | |
| NUMBER OF CALLED MOBILE STATIONS | DOWN | M | 1 | |
| NUMBER OF MOBILE STATION | DOWN | O | VARIABLE LENGTH | |
| INCOMING CALL IDENTIFICATION NUMBER | DOWN | O | 1 | |
| SENDER INFORMATION | DOWN | O | VARIABLE LENGTH | |

FIG. 7B

INFORMATION ELEMENT
EXAMPLE OF SENDER INFORMATION (VARIABLE LENGTH)     BIT ARRAY

| 8 | 7 | 6 | 5 | 4 | 3 | 2 | 1 |
|---|---|---|---|---|---|---|---|
| SENDER INFORMATION 1 | | | | | | | EA=0 |
| SENDER INFORMATION 2 | | | | | | | EA=0 |
| SENDER INFORMATION 3 | | | | | | | EA=0 |
| SENDER INFORMATION 4 | | | | | | | EA=0 |
| SENDER INFORMATION 5 | | | | | | | EA=0 |
| SENDER INFORMATION 6 | | | | | | | EA=0 |
| SENDER INFORMATION 7 | | | | | | | EA=1 |

EA: ADDRESS FIELD EXTENSION BIT
  CONTINUED WITH 0
  NOT CONTINUED WITH 1

MULTI-MODE COMMUNICATION APPARATUS AND METHOD INCLUDING MULTIPLE TRANSMITTER SECTIONS

BACKGROUND OF THE INVENTION

1. Field of the Invention

The present invention relates to a communication apparatus comprising a plurality of different radio transmitter sections, a method of controlling transmission operation of the communication apparatus, a computer readable medium on which a computer program of transmission operation control for the communication apparatus is stored and a communication system using the communication apparatus.

2. Description of the Related Art

Hitherto, a mobile communication apparatus for use in single systems contains one radio transmitter section and one radio receiving section. When radio transmitter sections and radio receiving sections in the technological levels of two different communication systems are stored simply in a single case in forming a mobile communication apparatus such as a portable telephone and a car telephone corresponding to the respective communication systems, mutual interference occurs due to leakage of electromagnetic waves among the different transmitter sections. Therefore, the respective transmitter sections must be shielded individually to prevent the mutual interference.

Further, although the respective transmitter sections are electrically connected and coupled in order to share an antenna, they generate unnecessary radio waves due to mutual modulation distortion caused by the coupling. Therefore, the unnecessary radio waves must be suppressed by inserting a non-reciprocal device such as an isolator and a circulator or by inserting a filtering device such as a duplexer on the wiring path connecting the transmitter sections.

However, the size and weight of the apparatus increase by enhancing the isolating performance of the parts such as the non-reciprocal device, filtering device and antenna switch. The size and weight of the apparatus also increase by enhancing the isolating performance to the shield. Therefore, they cannot be applied to a communication apparatus which requires portability such as a PDC (personal digital cellular telecommunication system)/PHS (personal handy-phone system) complex portable telephone.

Still more, it is not easy to realize sharing of the transmitter sections, or the transmitter sections for large power in particular, optimized for two communication systems having different frequency or modulating schemes because a technology must be developed for optimizing performance parameters of different indices. For instance, when a transmission power amplifier in a GSM (global system for mobile communication) scheme in which an envelope of transmission radio waves is constant is combined with a transmission power amplifier in a PDC scheme in which an envelope changes, an F-class operational amplifier in which no envelope is taken into account in case of only GSM must be combined with an AB-class operational amplifier in which an envelope is taken into account in case of only PDC to effectuate its efficiency in the same level with the amplifier of the respective systems. The efficiency of the amplifier determines the degree of power consumption and largely affects the usable speech time of a battery operation of the portable telephone. Therefore, the portable telephone which may be used for a long time as the user desires cannot be realized just by combining the amplifiers.

In Japanese Unexamined Patent Publication JP-A 10-336757 (1998) is disclosed a technology related to a mobile communication apparatus for implementing multi-modes communication among a plurality of autonomous communication systems and to a method for controlling the communication apparatus.

SUMMARY OF THE INVENTION

Hence it is an object of the invention to provide a communication apparatus capable of suppressing generation of unnecessary radiowaves due to mutual modulation distortion without increasing the size and weight of the communication apparatus and to provide a method of controlling transmission operation of the communication apparatus, a computer readable medium on which computer program of transmission operation control for the communication apparatus is stored and a communication system using the communication apparatus.

The invention provides a communication apparatus comprising a plurality of radio transmitter sections; and transmission control means for, when specific one of the plurality of radio transmitter sections is engaged in transmission, rejecting a transmission request which is made to another radio transmitter section of the plurality of radio transmitters which is not engaged in transmission.

According to the invention, the communication apparatus comprising the plurality of radio transmitter sections for different communication systems is constructed by individually shielding the radio transmitter section so that they do not interfere from each other in general. The radio transmitter sections are also electrically connected and coupled to share an antenna.

Although unnecessary radiowaves generated by mutual modulation distortion caused by the coupling have been suppressed by inserting a non-reciprocal device such as an isolator and a circulator or by inserting a filtering device such as a duplexer on a wiring route for connecting the radio transmitter sections, the size and weight of the communication apparatus have been increased by enhancing the isolation performance of the parts such as the non-reciprocal device, filtering device and antenna switch. Further, the size and weight of the apparatus increase by enhancing the isolation performance of the shield.

In the communication apparatus of the invention, a transmitting operation is controlled so as to reject the transmission request when the transmission request is made to another radio transmitter section when the specific radio transmitter section is engaged in transmission. Accordingly, the unnecessary radiowaves may be suppressed from being generated due to the mutual modulation distortion which is otherwise caused by the coupling of the respective radio transmitter sections without enhancing the isolation performance of the parts such as the non-reciprocal device, filtering device and antenna switch and without enhancing the isolation performance of the shield.

Accordingly, the quality of the transmitted radiowaves may be kept high without increasing the size and weight of the communication apparatus and the communication apparatus of the invention may be suitably used as a communication apparatus requiring portability in particular.

The invention provides a communication apparatus comprising a plurality of radio transmitter sections; and transmission control means for, when specific one among the plurality of radio transmitter sections is engaged in transmission, holding a transmission request which is made to another radio transmitter section thereamong which is not engaged in transmission, and validating the held transmission request when the transmission of the specific radio transmitter section ends.

According to the invention, the communication apparatus comprising the plurality of radio transmitter sections is constructed by individually shielding the radio transmitter section and electrically connecting the radio transmitter sections. Although unnecessary radiowaves generated by mutual modulation distortion caused by that have been suppressed by inserting the non-reciprocal device and the filtering device on the wiring route for connecting the radio transmitter sections, the size and weight of the communication apparatus have been increased by enhancing the isolation performance of those devices and shield.

In the communication apparatus of the invention, a transmitting operation is controlled so as to hold the transmission request once when the transmission request is made to the other radio transmitter section when the specific radio transmitter section is engaged in transmission and to validate the held transmission request again when the transmission of the specific radio transmitter section ends. Accordingly, the unnecessary radiowaves may be suppressed from being generated due to the mutual modulation distortion which is otherwise caused by the coupling of the respective radio transmitter sections without enhancing the isolation performance of those devices and the shield.

Accordingly, the quality of the transmitted radiowaves can be kept high without increasing the size and weight of the communication apparatus and the complicated process of the retransmission request which is made manually by the user to be eliminated. Thus, the communication apparatus of the invention may be suitably used as a communication apparatus requiring portability in particular.

The invention provides a communication apparatus comprising a plurality of radio transmitter sections; a radio receiving section; and transmission control means for, when specific one among the plurality of radio transmitter sections is engaged in transmission, judging a transmission request which is made to another radio transmitter section thereamong which is not engaged in transmission, whether or not the transmission request is of a signal which is produced based on information repeatedly received by the radio receiving section; rejecting the transmission request when the transmission request is of a signal which is produced based on the received information or holding the transmission request when being not of the signal; and validating the held transmission request when the transmission of the specific radio transmitter section ends.

According to the invention, the communication apparatus comprising the plurality of radio transmitter sections is constructed by individually shielding the radio transmitter section and electrically connecting the radio transmitter sections as described above. Although unnecessary radiowaves generated by mutual modulation distortion caused by that have been suppressed by inserting the non-reciprocal device and the filtering device on the wiring route for connecting the radio transmitter sections, the size and weight of the communication apparatus have been increased by enhancing the isolation performance of those devices and shield.

In the communication apparatus of the invention, the transmission control means judges whether or not the transmission request is of a signal which is produced based on information repeatedly received by the radio receiving section when the transmission request is made to the other radio transmitter section when one specific radio transmitter section is engaged in transmission. The transmission control means then rejects the transmission request when the transmission request is of a signal which is generated based on the received information. The transmission control means holds the transmission request once when it is not the signal which is generated based on the received information and validates the held transmission request again when the transmission of the specific radio transmitter section ends. Thus, the transmitting operation is controlled. Accordingly, the unnecessary radiowaves may be suppressed from being generated due to the mutual modulation distortion which is otherwise caused by the coupling of the respective radio transmitter sections without enhancing the isolation performance of those devices and the shield. The transmission control means also allows the transmission by using the other radio transmitter section to which the transmission request has been made. Still more, the necessity of holding the unnecessary transmission request is eliminated, and an erroneous operation of the apparatus can be prevented.

The communication apparatus of the invention further comprises storage means for storing information received by the radio receiving section and information related to the received information when the transmission control means rejects the transmission request.

According to the invention, it is possible to store the fact that there has been a transmission request in the storage means even when the transmission request is rejected, so that the user of the communication apparatus of the invention can confirm that there has been the transmission request by reading the received information from the storage means. Accordingly, it is possible to prevent the convenience of the user of the communication apparatus of the invention from being hampered.

The communication apparatus of the invention further comprises announcing means for announcing information received by the radio receiving section and information related to the received information when the transmission control means rejects the transmission request.

According to the invention, the announcing means informs the user that there has been the transmission request even when the transmission request has been rejected. Accordingly, it is possible to prevent the convenience of the user from being hampered.

The invention provides a computer readable medium on which a computer program for computer control of transmission operation of a communication apparatus comprising a plurality of radio transmitter sections is stored, the computer program comprising:

judging whether or not specific one among the plurality of radio transmitter sections is engaged in transmission; and in the case where the specific transmitter section is engaged in transmission, rejecting a transmission request which is made to another radio transmitter section thereamong.

The invention allows the computer to control so as to reject the transmission request as described above in the transmitting operation of the communication apparatus.

The invention provides a computer readable medium on which a computer program for computer control of transmission operation of a communication apparatus comprising a plurality of radio transmitter sections is stored, the computer program comprising:

judging whether or not specific one among the plurality of radio transmitter sections is engaged in transmission;

in the case where the specific transmitter section is engaged in transmission, holding a transmission request which is made to another radio transmitter section thereamong; and validating the held transmission request when the transmission of the specific radio transmitter section ends.

The invention allows the computer to control so as to hold and to validate again the transmission request as described above in the transmitting operation of the communication apparatus.

The invention provides a computer readable medium on which a computer program for computer control of transmission operation of a communication apparatus comprising a plurality of radio transmitter sections is stored, the computer program comprising:

judging whether or not specific one among the plurality of radio transmitter sections is engaged in transmission;

in the case where the specific transmitter section is engaged in transmission, judging whether or not a transmission request is of a signal which is produced based on information repeatedly received by the radio receiving section;

in the case where the transmission request is of a signal which is generated based on the received information, rejecting the transmission request, and holding the transmission request when being not of the signal which is generated based on the received information; and validating the held transmission request when the transmission of the specific radio transmitter section ends.

The invention allows the computer to control so as to reject the transmission request, to make a transmission request or to validate again corresponding to the mode of the transmission request as described above in the transmitting operation of the communication apparatus.

The communication apparatus of the invention further comprises storage means and the control program causes the storage means to store information received by the radio receiving section and information related to the received information in the storage means when the transmission request is rejected.

According to the invention, the communication apparatus may be controlled so as to store the received information and the information related to the received information in the storage means when the transmission request is rejected.

The communication apparatus of the invention further comprises announcing means and the control program causes the announcing means to announce information received by the radio receiving section and information related to the received information from the announcing means when the transmission request is rejected.

According to the invention, the communication apparatus may be controlled so as to inform the received information and the information related to the received information from the announcing means by the computer when the transmission request is rejected.

The invention provides a method of controlling transmission operation of a communication apparatus comprising a plurality of radio transmitter sections, comprising the steps of;

judging whether or not specific one among the plurality of radio transmitter sections is engaged in transmission and;

rejecting in the case where the specific radio transmitter section is judged as being engaged in transmission, a transmission request which is made to another transmitter section thereamong which is not engaged in transmission.

The invention allows to control so as to reject the transmission request as described above in the transmitting operation of the communication apparatus.

The invention provides a method of controlling transmission operation of a communication apparatus comprising a plurality of radio transmitter sections, comprising the steps of:

judging whether or not specific one among the plurality of radio transmitter sections is engaged in transmission;

in the case where the specific transmitter section is judged as being engaged in transmission, holding a transmission request which is made to another radio transmitter section thereamong; and validating the held transmission request when the transmission of the specific radio transmitter section ends.

The invention allows to control so as to hold and to validate again the transmission request as described above in the transmitting operation of the communication apparatus.

The invention provides a method of controlling transmission operation of a communication apparatus comprising a plurality of radio transmitter sections and a radio receiver section, comprising:

a first judging step of judging whether or not specific one among the plurality of radio transmitter sections is engaged in transmission;

a second judging step of, in the case where the specific transmitter section is judged as being engaged in transmission, judging whether or not a transmission request is of a signal which is produced based on information repeatedly received by the radio receiving section;

a step of, in the case where the transmission request is of a signal which is generated based on the received information, rejecting the transmission request;

a holding step of holding the transmission request when being not of the signal which is generated based on the received information; and a validating step of validating the held transmission request when the transmission of the specific radio transmitter section ends.

The invention allows to control so as to reject the transmission request, to hold and to validate again the transmission request as described above corresponding to the mode of the transmission request in the transmitting operation of the communication apparatus.

The communication apparatus of the invention further comprises storage means and the method of controlling transmission operation of the communication apparatus comprises a step of storing information received by the radio receiving section and information related to the received information in the storage means after the transmission request rejecting step.

According to the invention, the communication apparatus may be controlled so as to store the received information and the information related to the received information in the storage means when the transmission request is rejected.

The communication apparatus of the invention further comprises announcing means and the method of controlling transmission operation of the communication apparatus comprises a step of announcing information received by the radio receiving section and information related to the received information from the announcing means after the transmission request rejecting step.

According to the invention, the communication apparatus may be controlled so as to inform the received information and the information related to the received information from the announcing means when the transmission request is rejected.

The invention is characterized in that the communication systems different from each other may be used in the same time while controlling the transmitting operation so as not to use the respective radio transmitter sections of different communication systems of the communication apparatus simultaneously. However, the communication apparatus disclosed in Japanese Unexamined Patent Publication JP-A 10-336757 (1998) uses the common resources and cannot make communication using the respective communication systems in the same time. Although the communication apparatus in the JP-A 10-336757 implements scheduling, it does not imply the technology for making the communication using the respective communication systems in the same time.

The invention is also characterized in that when the communication apparatus receives call incoming information in one communication system and is required to respond to the base station while talking in another communication system, it makes no answer and receives, stores or informs information sent with the call incoming information. However, the communication apparatus in the JP-A 10-336757 cannot make communication using the respective communication systems in the same time and only implements scheduling. Accordingly, it does not imply the inventive receiving operation.

The invention provides a communication system comprising the communication apparatus comprising the plurality of radio transmitter sections, radio receiving sections and the storage means or the announcing means; and an exchange for transmitting a transmission request to the communication apparatus, the communication system using a communication sequence requiring a response from the communication apparatus to the transmission request from the exchange, wherein a message from the exchange of the communication sequence before the response from the communication apparatus contains information regarding the pager.

According to the invention, the communication is made between the communication apparatus and the exchange. The unnecessary radiowaves generated due to the mutual modulation distortion which is otherwise caused by the coupling of the respective radio transmitter sections are suppressed without enhancing the isolation performance of the devices and shield and the transmission is made by using the other radio transmitter section to which a transmission request has been made by controlling the transmitting operation as described above in the communication apparatus. Further, it is possible to prevent an erroneous operation of the apparatus by not holding the unnecessary transmission request.

Still more, information regarding the pager is contained in the message from the exchange of the communication sequence before the response from the communication apparatus in the inventive communication system, so that it is possible to store the fact that there has been a transmission request by the information regarding the pager in the storage means even when the communication apparatus rejects the transmission request. Accordingly, the user of the communication apparatus can confirm that there has been the transmission request by reading the information stored in the storage means. Or, it is possible to inform that there has been the transmission request to the user of the communication apparatus even when the communication apparatus from the announcing means has rejected the transmission request. Accordingly, it is possible to prevent the convenience of the user of the communication apparatus from being hampered.

BRIEF DESCRIPTION OF THE DRAWINGS

Other and further objects, features, and advantages of the invention will be more explicit from the following detailed description taken with reference to the drawings wherein:

FIGS. 2A and 2B are front and side views showing the outside structure of the portable telephone 21;

FIGS. 3A and 3B are tables showing a storage section 22 of data representing current states and operational requests in a storage section 18 of the portable telephone 21, wherein FIG. 3A shows the state before the transition of the operational state and FIG. 3B shows the state after the transition, respectively;

FIG. 5 is a table showing a storage section 28 of data representing the contents of processes corresponding to the current states and the operational requests in the storage section 18 of the portable telephone 21;

FIG. 7A is a table showing a structural example of paging signals in the communication system using the portable telephone 21;

FIG. 7B is a table showing a structural example of sender information contained in the paging signal in the communication system using the portable telephone 21.

DETAILED DESCRIPTION OF THE PREFERRED EMBODIMENTS

Figure 1:
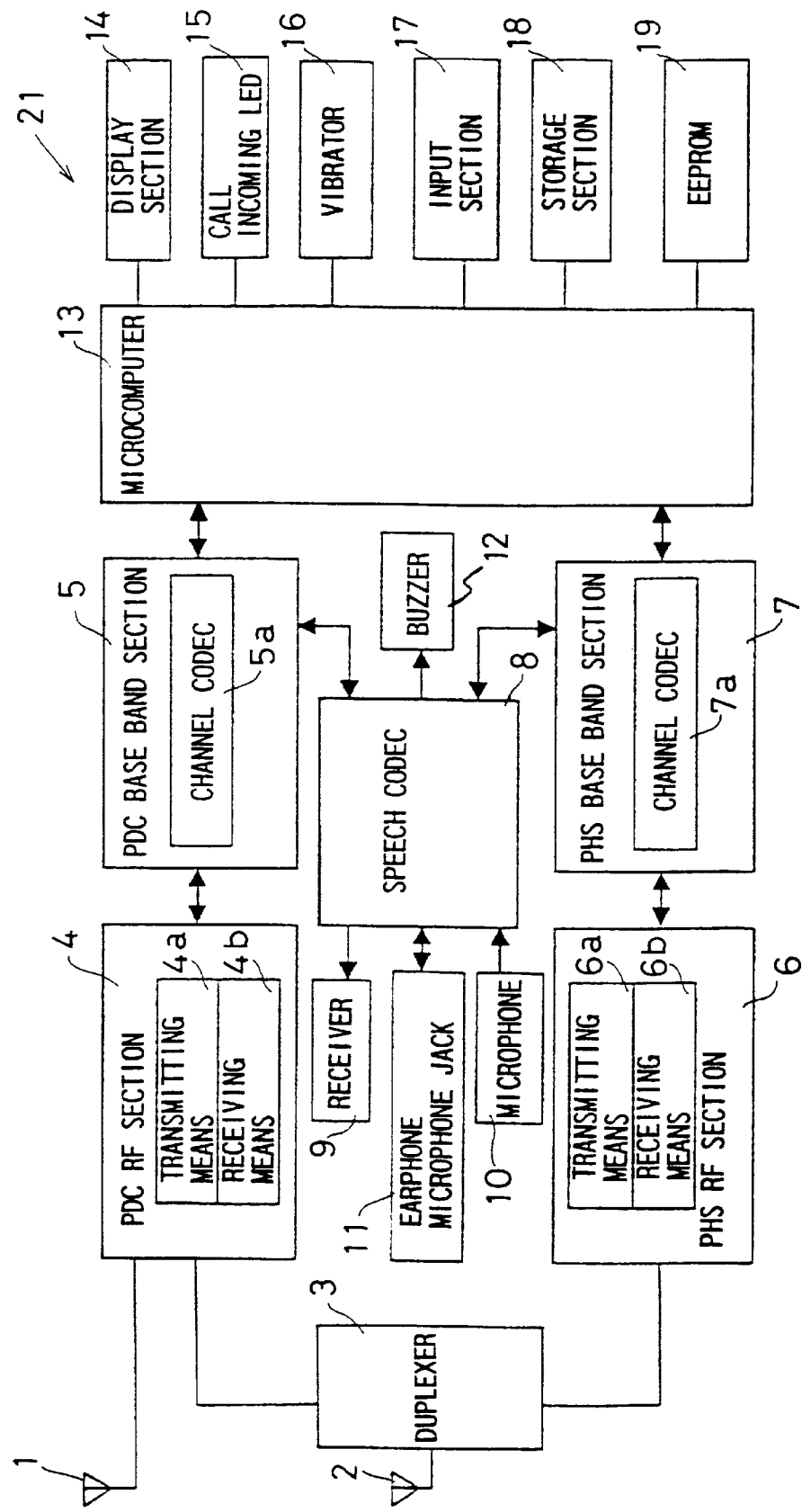
FIG. 1 is a block diagram showing the electrical structure of a PDC/PHS complex type portable telephone 21 which is a communication apparatus of one embodiment of the invention.

Now referring to the drawings, preferred embodiments of the invention are described below.

FIG. 1 is a block diagram showing the electrical structure of a PDC/PHS complex type portable telephone 21 which is a communication apparatus of one embodiment of the invention. FIGS. 2A and 2B are front and side views showing the outside structure of the portable telephone 21. The portable telephone 21 is capable of selectively executing the portable (PDC) mode and the PHS mode using communication systems different from each other. It is noted that although it is possible to selectively carry out the OS (office station) mode and the PHS Home Station Mode, they will be explained briefly here.

The portable telephone 21 comprises radio antennas 1 and 2, a duplexer 3, a PDC RF (radio frequency) section 4, a PDC base band section 5, a PHS RF section 6, a PHS base band section 7, a voice codec 8, a receiver 9, a microphone 10, an earphone microphone jack 11, a buzzer 12, a microcomputer 13, a display section 14, a termiantion LED (light emitting diode) 15, a vibrator 16, an input section 17, a storage section 18 and an EEPROM (erasable and electrically programmable read only memory) 19.

PDC communication means is composed of the radio antennas 1 and 2, the duplexer 3, the PDC RF section 4 and the PDC base band section 5. Communication of controls, speech, data or the like is made through the PDC communication means by using radiowaves with PDC radio base station. The duplexer 3 is a filtering device for commonly using the radio antenna 2 among the PDC RF section 4 and the PHS RF section 6. The PDC RF section 4 comprises transmitting means 4a and receiving means 4b. The PDC base band section 5 comprises a channel codec 5a for converting an array of data in the radio section to data to be communicated.

Public (or customer owned) PHS communication means is composed of the radio antenna 2, the PHS RF section 6 and the PHS base band section 7. Communication of control, speech, data or the like is made through the PHS communication means by using radiowaves with a PHS radio base station, a digital cordless master telephone set, a private PHS exchange system or the like. The PHS RF section 6 comprises transmitting means 6a and receiving means 6b. The PHS base band section 7 comprises a channel codec 7a for converting an array of data in a radio section to data to be communicated.

The voice codec 8 comprises a DSP (digital signal processor) for coding and decoding speeches under the control of a program. A speech signal decoded by the voice codec 8 is emitted to the outside by the receiver 9. An external speech collected by the microphone 10 is also supplied to the voice codec 8. The speech signal decoded by the voice codec 8 is also outputted to the outside by the earphone microphone jack 11 and the speech signal inputted from the outside by the earphone microphone jack 11 is supplied to the voice codec 8. A sound of call incoming supplied from the voice codec 8 is also emitted to the outside by the buzzer 12.

The microcomputer 13 controls protocols and various user interfaces for using the respective communication means, and also performs the functions as selecting means and receiving quality processing means. The display section 14 comprises LCD (liquid crystal display) and others to indicate various states, telephone numbers and the like. The call incoming LED 15 flashes during call incoming to inform of that. The vibrator 16 vibrates the main body of the portable telephone 21 during call incoming to inform of that. The input section 17 comprises key switches for inputting a telephone number and mode buttons for selecting a communication mode to be used.

The storage section 18 comprises a flash ROM (read only memory) and an RAM (random access memory) to store data representing the current state and a operational request, data representing transition of states, data representing the contents of processing corresponding to the current state and operational request and received information. The EEPROM 19 stores ID information such as a telephone number in each communication mode.

Then, a portable telephone number is given to the PDC/PHS complex type portable telephone 21 constructed as described above and information necessary for connection is stored in the EEPROM 19 by subscribing in a portable telephone (PDC) service. Thus, the user thereof can make actual communication through the PDC radio base station (this communication method will be called as "portable mode" hereinbelow). Further, a PHS telephone number is given and information necessary for connection is stored in the EEPROM 19 by subscribing in a PHS public network service. Thus, the user thereof can make actual communication through the PHS radio base station (this communication method will be called as "PHS mode" hereinbelow). It is noted that an extension number is given and information necessary for connection is stored in the EEPROM 19 by registering to a private PHS exchange. Thus, the user thereof can make actual communication through the private PHS exchange (this communication method will be called as "OS (office station) mode" hereinbelow). Still more, an extension number is given and information necessary for connection is stored in the EEPROM 19 by registering to a digital cordless master telephone set. Thus, the user thereof can make actual communication through the digital cordless master telephone set (this communication method will be called as "PHS Home Station mode" hereinbelow).

It is noted that although there is a communication method which allows the "PHS mode" to be used inside of a house through a home antenna having a repeater function and set within the house within a service area of the PHS radio base station besides those described above, its detailed explanation will be omitted here.

The PDC/PHS complex type portable telephone 21 constructed as described above will be explained below by dividing the operation thereof in the "portable mode" into [Waiting], [Call Incoming], [Communication] and [Call Origination].

[Waiting]

When power is put in, the microcomputer 13 reads the subscriber's number (MSN), a mobile station number (MSI), a perch channel number and the like from the EEPROM 19, measures a receiving level of a frequency corresponding to all perch channel numbers and creates a table in the order of the receiving levels to store in the RAM of the storage section 18. Then, first, switching to the highest level frequency is carried out, and synchronization (frame synchronization and super frame synchronization) is established by the channel codec 5a of the PDC base band section 5 and the microcomputer 13. After that, the microcomputer 13 reads announce information from the base station to check waiting conditions and others and shifts to a waiting channel specified by the announce information.

It is noted that when no synchronization is taken or no waiting condition is met, the portable telephone 21 switches to the next frequency based on the table in the order of level stored in the RAM of the storage section 18 and repeats the above-mentioned operation.

Then, during waiting, the portable telephone 21 carries out intermittent receiving in which the channel codec 5a of the PDC base band section 5 receives PCH (paging channel) on the common control channel intermittently. Further, during waiting, the portable telephone 21 measures field strength of the peripheral channels specified by own and announce information by the receiving means 4b of the PDC RF section 4.

[Terminaton]

The PDC radio base station transmits radio by carrying information on call incoming on the PCH to a mobile station to be called. The mobile station is receiving the call incoming information on the PCH every time by the channel codec 5a of the PDC base band section 5. Then, when it is call incoming information to the own station as a result of analysis of information by the microcomputer 13, the portable telephone 21 controls the voice codec 8 by the microcomputer 13 to output a termiantion sound to the buzzer 12 or to vibrate the vibrator 16 and flashes the call incoming LED 15.

At this time, the portable telephone 21 also transmits a report on the radio state including the field strength of the own station and the peripheral channels to the PDC radio base station. Thereafter, the microcomputer 13 sets the communication channel in accordance with the standard protocol of the digital car telephone system by exchanging messages with the PDC radio base station via the channel codec 5a of the PDC base band section 5.

[Communication]

Either speech communication or data communication is carried out in the communication channel. When it is the speech communication, the portable telephone 21 receives radiowaves via the antenna 1 or 2 (switched by diversity) and outputs signals from the PDC RF section 4 to the receiver 9 or the earphone microphone jack 11 via the PDC base band section 5 and the voice codec 8. The portable telephone 21 also transmits speech inputted from the microphone 10 or the earphone microphone jack 11 as radiowaves by the antenna 2 via the voice codec 8, the PDC base band section 5 and the PDC RF section 4.

Meanwhile, when it is the data communication, the portable telephone 21 receives/transmits radiowaves in the same manner with the case of the speech communication described above. However, signals from the PDC base band section 5 are outputted to an external interface connector via an interface circuit not shown so as to carry out the data communication by an external apparatus connected to the external interface connector.

[Call Origination]

When the user carries out a call originating operation by manipulating the keys of the input section 17 during waiting of the mobile station, the microcomputer 13 creates a message containing a destination number and the peripheral field strength and transmits it to the PDC radio base station as radiowaves from the antenna 2 via the channel codec 5a of the PDC base band section 5 and the PDC RF section 4. Thereafter, the microcomputer 13 exchanges messages with the PDC radio base station via the channel codec 5a of the PDC base band section 5 to set a communication channel in accordance with the standard protocol of the digital car telephone system.

While the operations in the "portable mode" have been described above, the operations in the "PHS mode" will be explained below by dividing into [Waiting (Intermittent Receiving)], [Call Incoming] and [Origination]. It is noted that its operation of [Communication] is the same with the operation in the "portable mode" described above, so that its explanation will be omitted here. The explanation will be also given by defining the mobile station as "PS" (personal station" and the base station as "CS" (cell station) below so as not to confuse with those in the operation in the "portable mode" described above.

[Waiting (Intermittent Receiving)]

When the power of the PS is turned on, the microcomputer 13 reads CS-ID (CS identification code) and PS-ID (PS identification code) from the EEPROM 19 to supply to the PHS base band section 7. Then, the PHS base band section 7 receives an announce channel which the CS transmits intermittently via the antenna 2 and the PHS RF section 6 and the microcomputer 13 compares the CS-ID within the received announce channel with the CS-ID read from the EEPROM 19. When those CS-IDs coincide, the PS validates the information within the announce channel.

The PS also receives a simultaneous paging channel which the CS transmits intermittently in the same manner and compares the CS-IDs. When they coincide, the PS validates information of that channel and shifts to the intermittent receiving operation. The PS measures the strength of radiowaves coming from the CS by the receiving means 6b of the PHS RF section 6 during the intermittent receiving operation.

[Call Incoming]

When there is a termiantion during the intermittent receiving operation of the PS by the intermittent transmission of the CS, the CS transmits the call incoming information by carrying on the simultaneous paging channel (in the same procedure with the intermittent transmission) to inform the PS of the call incoming. When the PS receives the simultaneous paging channel containing this call incoming information, the microcomputer 13 controls the voice codec 8 to output the call incoming sound to the buzzer 12 or to vibrate the vibrator 16 and flashes the call incoming LED 15. After that, the PS returns connection confirming information to the CS via an individual cell channel.

[Call Origination]

When the user carries out a call originating operation by manipulating the keys of the input section 17 of the PS during the intermittent receiving operation of the PS in the intermittent transmission of the CS, the microcomputer 13 transmits a request for establishing a link channel to the CS via the individual cell channel by a control carrier by using the PHS base band section 7 and the PHS RF section 6. Then, receiving that request, the CS carrier-senses a communication carrier selected at random for example. When a slot corresponding to that carrier is not used, the CS returns an allocation of link channel to the PS by the control carrier, switches to the allocated carrier and waits for synchronization burst.

Meanwhile, receiving the allocation of link channel, the PS switches to the allocated communication carrier and carries out the carrier sense. Then, the PS sets the communication channel in accordance with the standard protocol of the second generation digital cordless telephone system by transmitting the synchronization burst.

While the operations in the "PHS mode" have been described, the detailed explanation of the operations in the "OS mode" and a"HS mode" will be omitted here. Next, the operations in state transition processes when operation requests are generated will be explained based on the diagrams in FIGS. 3 through 5 and the flowchart in FIG. 6.

The storage section 18 stores data representing current states and operational requests, data representing state transitions and data representing the contents of processes corresponding to the current states and operational requests.

FIGS. 3A and 3B are tables showing a storage section 22 of the data representing the current state and the operational request in the storage section 18 of the portable telephone 21, wherein FIG. 3A shows the state before the transition of the operational state and FIG. 3B shows the state after the transition, respectively. The storage section 22 comprises a current state storage area 23 for storing the data representing the current state and an operational request storage area 24 for storing the data representing the operational request and is constructed by correlating them.

Figure 4:
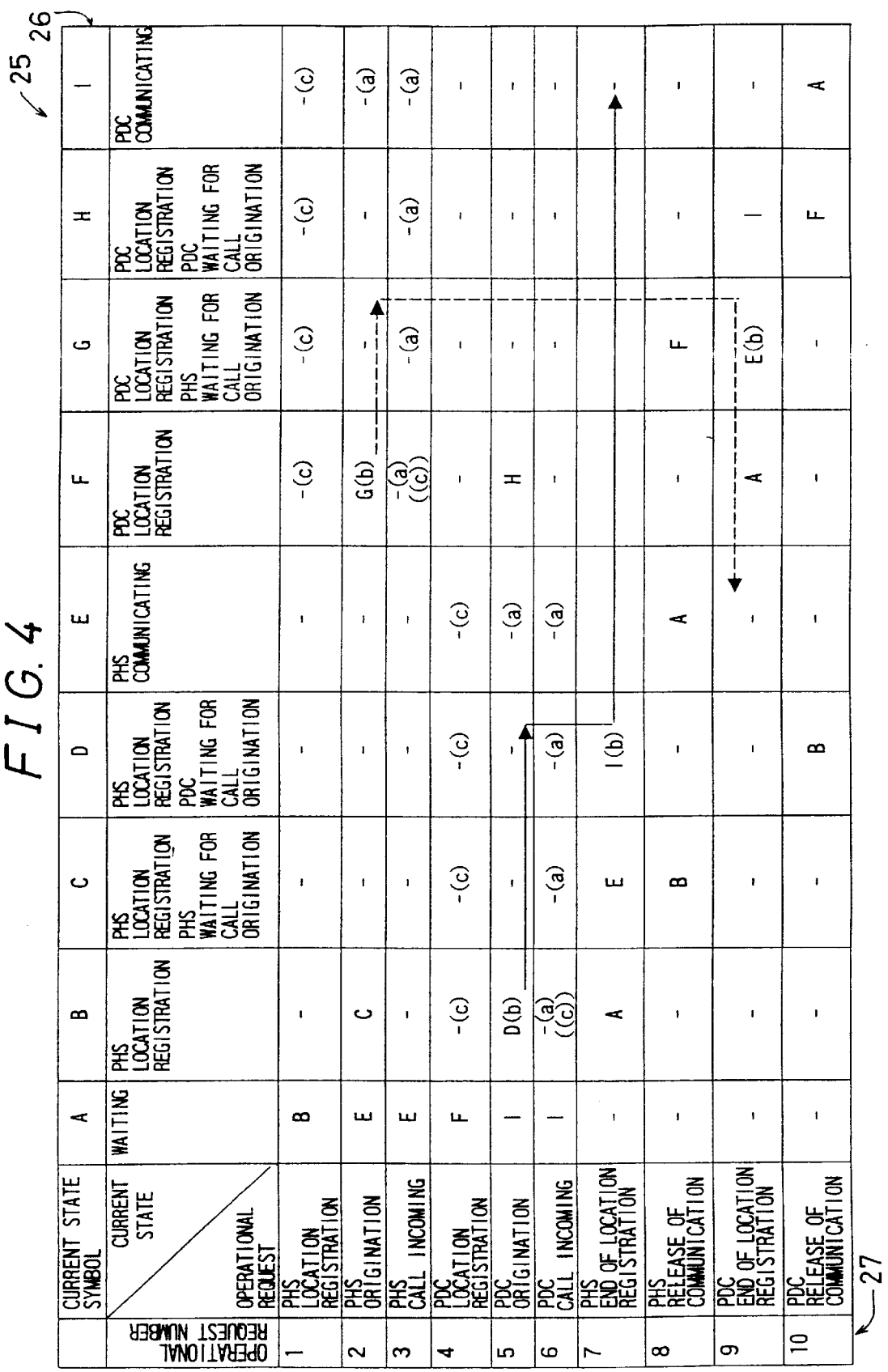
FIG. 4 is a table showing a storage section 25 of data representing the transition of states in the storage section 18 of the portable telephone 21.

FIG. 4 is a table showing a storage section 25 of data representing the transition of states in the storage section 18 of the portable telephone 21. The storage section 25 may be represented in a table format in which a current state storage area 26 for storing the data representing the current states is taken horizontally and an operational request storage area 27 for storing the data representing the operational requests is taken vertically.

The current states include items of "A: Waiting", "B: PHS Location Registration", "C: PHS Location Registration/Waiting for Origination in PHS", "D: PHS Location Registration/Waiting for Origination in PDC", "E: Communicating in PHS", "F: PDC Location Registration", "G: PDC Location Registration/Waiting for Origination in PHS", "H: PDC Location Registration/Waiting for Origination in PDC" and "I: Communicating in PDC" and the operational requests include items of "1: PHS Location Registration", "2: Origination in PHS", "3: Call Incoming in PHS", "4: PDC Location Registration", "5: Origination in PDC", "6: Call Incoming in PDC", "7: End of PHS Location Registration", "8: Release of PHS Communication", "9: End of PDC Location Registration" and "10: Release of PDC Communication". When the operational request in the vertical axis is generated in the current state in the horizontal axis, the state is shifted to the state described in a column where the current state of the horizontal axis superimposes with the operational request of the vertical axis.

FIG. 5 is a table showing a storage section 28 of data representing the contents of processes corresponding to the current states and the operational requests in the storage section 18 of the portable telephone 21. The storage section 28 includes a storage area 29 for storing data representing the current states and the operational requests and a processing content storage area 30 for storing data representing the contents of processes and is constructed by correlating them each other. An item of "Contents of Process" is set for an item process coincident with the current state and operational request are executed.

In case when the current state is "A: Waiting", the state is shifted to "B: PHS Location Registration" when the operational request of "1: PHS Location Registration" is made, to "E: Communicating in PHS" when the operational requests of "2: Call Origination in PHS" and "3: Call Incoming in PHS" are made, to "F: PDC Location Registration" when the operational request of "4: PDC Location Registration" is made and to "I: Communicating in PDC" when the operational requests of "5: Call Origination in PDC" and "6: Call Incoming in PDC" are made, respectively. The current state is maintained when the operational requests of "7: End of PHS Location Registration", "8: Release of PHS Communication", "9: End of PDC Location Registration" and "10: Release of PDC Communication" are made.

In case when the current state is "B: PHS Location Registration", the state is shifted to a state of "C: PHS Location Registeration/Waiting for Origination in PHS" when the operational request of "2: Call Origination in PHS" is made, to a state of "D: PHS Location Registration/Waiting for Origination in PDC" when the operational request of "5: Call Origination in PDC" is made and to "A: Waiting" when the operational request of "7: End of PHS Location Registration" is made, respectively. The current state is maintained when the operational requests of "1: PHS Location Registration", "3: Call Incoming in PHS", "4: PDC Location Registration", "6: Call Incoming in PDC", "8: Release PHS Communication", "9: End of PDC Location Registration" and "10: Release of PDC Communication" are made.

In case when the current state is "C: PHS Location Registration/Waiting for Origination in PHS", the state is shifted to "E: Communicating in PHS" when the operational request of "7: End of PHS Location Registration" is made and to the state of "B: PHS Location Registration" when the operational requests of "8: Release PHS Communication" is made, respectively. The current state is maintained when the operational requests of "1: PHS Location Registration", "2: Call Origination in PHS", "3: Call Incoming in PHS", "4: PDC Location Registration", "5: Call Origination in PDC", "6: Call Incoming in PDC", "9: End of PDC Location Registration" and "10: Release of PDC Communication" are made.

In case when the current state is "D: PHS Location Registration/Waiting for Origination in PDC", the state is shifted to "I: Communicating in PDC" when the operational request of "7: End of PHS location Registration" is made and to "B: PHS Location Registration" when the operational request of "10: Release PDC Communication" is made, respectively. The current state is maintained when the operational request of "1: PHS Location Registration", "2: Call Origination in PHS", "3: Call Incoming in PHS", "4: PDC Location Registration", "5: Call Origination in PDC", "6: Call Incoming in PDC", "8: Release PHS Communication" and "9: End of PDC Location Registration" are made.

In case when the current state is "E: Communicating in PHS", the state is shifted to "A: Waiting" when the operational request of "8: Release PHS Communication" is made and the current state is maintained when the operational requests of "1: PHS Location Registration", "2: Call Origination in PHS", "3: Call Incoming in PHS", "4: PDC Location Registration", "5: Call Origination in PDC", "6: Call Incoming in PDC", "7: End of PHS Location Registration", "9: End of PDC Location Registration" and "10: Release PDC Communication" are made.

In case when the current state is "F: PDC Location Registration", the state is shifted to "G: PDC Location Registration/Waiting for Origination in PHS" when the operational request of "2: Call Origination in PHS" is made, to "H: PDC Location Registration/Waiting for Origination in PDC" when the operational request of "5: Call Origination in PDC" is made and to "A: Waiting" when the operational request of "9: End of PDC Location Registration" is made, respectively. The current state is maintained when the operational requests of "1: PHS Location Registration", "3: Call Incoming in PHS", "4: PDC Location Registration", "6: Call Incoming in PDC", "7: End of PHS Location Registration", "8: Release PHS Communication", and "10: Release PDC Communication" are made.

In case when the current state is "G: PDC Location Registration/Waiting for Origination in PHS", the state is shifted to "F: PDC Location Registration" when the operational request of "8: Release PHS Communication" is made and to "E: Communicating in PHS" when the operational request of "9: End of PDC Location Registration" is made, respectively. The current state is maintained when the operational requests of "1: PHS Location Registration", "2: Call Origination in PHS", "3: Call Incoming in PHS", "4: PDC Location Registration", "5: Call Origination in PDC", "6: Call Incoming in PDC", "7: End of PHS Location Registration" and "10: Release PDC Communication" are made.

In case when the current state is "H: PDC Location Registration/Waiting for Origination in PDC", the state is shifted to "I: Communicating in PDC" when the operational request of "9: End of PDC Location Registration" is made and to "F: PDC Location Registration" when the operational request of "10: Release PDC Communication" is made, respectively. The current state is maintained when the operational requests of "1: PHS Location Registration", "2: Call Origination in PHS", "3: Call Incoming in PHS", "4: PDC Location Registration", "5: Call Origination in PDC", "6: Call Incoming in PDC", "7: End of PHS Location Registration" and "8: Release PHS Communication" are made.

In case when the current state is "I: Communicating in PDC", the state is shifted to "A: Waiting" when the operational request of "10: Release PDC Communication" is made and the current state is maintained when the operational requests of "1: PHS Location Registration", "2: Call Origination in PHS", "3: Call Incoming in PHS", "4: PDC Location Registration", "5: Call Origination in PDC", "6: Call Incoming in PDC", "7: End of PHS Location Registration", "8: Release PHS Communication" and "9: End of PDC Location Registration" are made.

Figure 6:
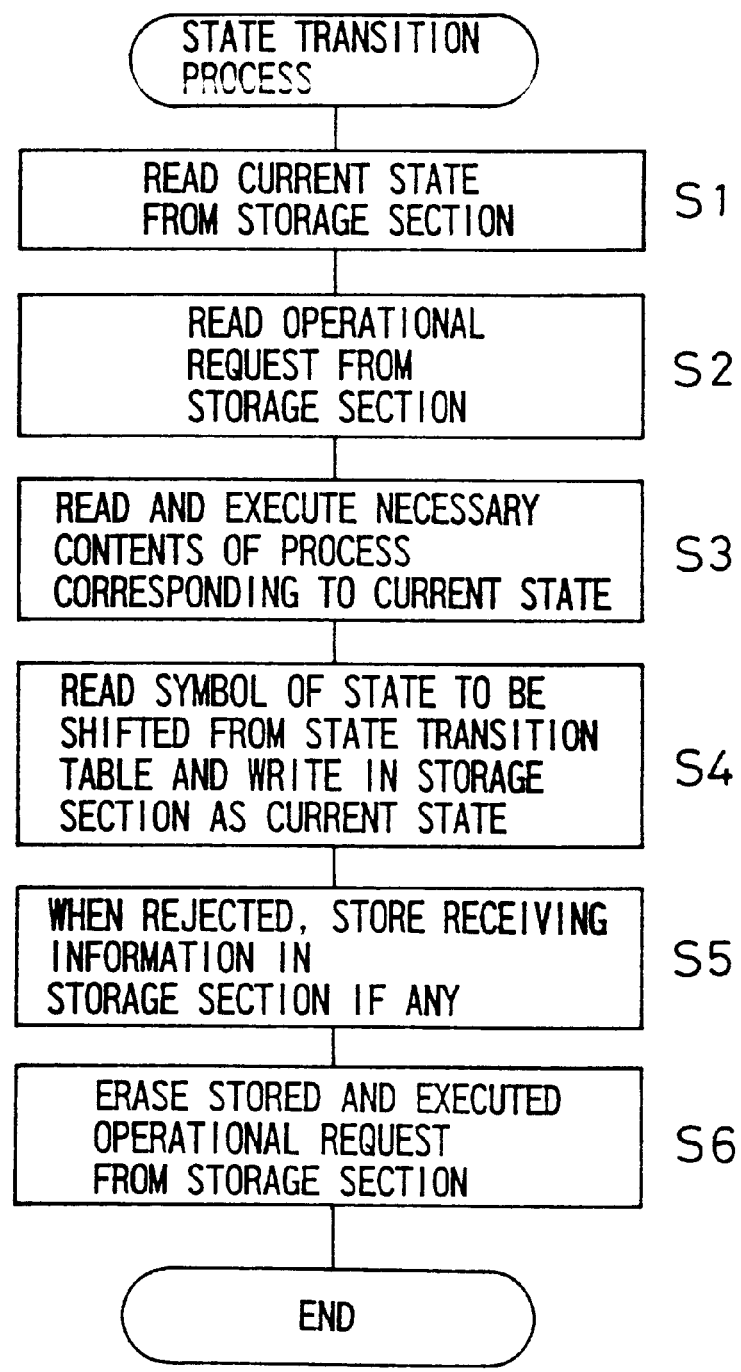
FIG. 6 is a flowchart showing the operations of the portable telephone 21 in processing the transition of states when an operational request is generated.

FIG. 6 is a flowchart showing the operations of the portable telephone 21 in processing the transition of states when an operational request is generated. When the user, the base station or the main body of the apparatus generates an operational request when the data representing the current state and operational request is stored in the storage section 22, the data representing the state transition is stored in the storage section 25 and the contents of processes corresponding to the current state and the operational request are stored in the storage section 28, respectively, the microcomputer 13 stores the data representing the operational request in the operational request storage area 24 of the storage section 22. The microcomputer 13 also executes the state transition processing operation shown in FIG. 6.

When the call incoming LED 15 starts to execute the state transition processing operation, the microcomputer 13 reads the data representing the current state from the storage section 22 in step S1 and reads the data representing the operational request from the storage section 22 in the same manner in step S2. Next, the microcomputer 13 reads and executes the contents of processes corresponding to the current state and the operational request read with reference to the storage section 28 in step S3. The microcomputer 13 also reads the state to be shifted from the data of the current state and the operational request read with reference to the storage section 25 and writes them as the current state in the storage section 22 in step S4. When the contents of process read in step S3 are "rejected", the microcomputer 13 stores receiving information in the storage section 18 if any in step S5, or informs of that by announcing from announcing means, or more concretely by indicating on the display section 14 or by outputting sound from the receiver 9. The microcomputer 13 then erases the data representing the operational request stored in the operational request storage area 24 of the storage section 22 and executed from the area 24 in step S6. The state transition processing operation is thus ended.

Accordingly, when "A: Waiting" is stored in the area 23 of the storage section 22 as the current state as shown in FIG. 3A and when a call incoming is informed by the PDC radio base station by using a paging signal and that paging signal is directed to the own station, the operational request of "6: Call Incoming in PDC" is generated and is stored in the area 24 of the storage section 22. Then, the state transition processing operation shown in FIG. 6 is executed.

It is noted that this paging signal is composed of "Message Type", "Length of BCCH Receiving Section", "Number of Paged Mobile Stations", "Number of Mobile Station", "Incoming Call Identification Number" and "Sender Information" as shown in FIG. 7A. "Message Type" indicates that the signal is for paging, "Number of Paged Mobile Stations" indicates a number of mobile stations (I stations in this case), "Number of Mobile Station" indicates MSI of the mobile station whose call incoming is paged (the call is judged as incoming call when this MSI coincides with MSI of own station), "Incoming Call Identification Number" indicates a control number temporarily assigned in the network and "Sender Information" indicates information such as a telephone number of the call originator. "Sender Information" may be obtained by information of 49 bits of 7 bits×7 words for example as shown in FIG. 7B. The reason why the information of 49 bits of 7 bits×7 words is adopted is that it is assumed that at least 4 bits are required per one digit normally to transmit a telephone number of "11 digits, i.e., "44" bits or more in total, and the number of bits is not limited to such number.

Then, "A: Waiting" and "6: Call Incoming in PDC" are read from the storage section 22 as the current state and the operational request, the operation of call incoming in PDC is executed as the content of process corresponding to "A-6" and read from the storage section 28, "I: Communicating in PDC" is written to the area 23 of the storage section 22 as the current state based on the data of the state transition stored in the storage section 25 and the operational request of "6: Call Incoming in PDC" is erased from the area 24 of the storage section 22, thus turning out FIG. 3B in accordance with the state transition processing operation shown in FIG. 6.

Figure 8:
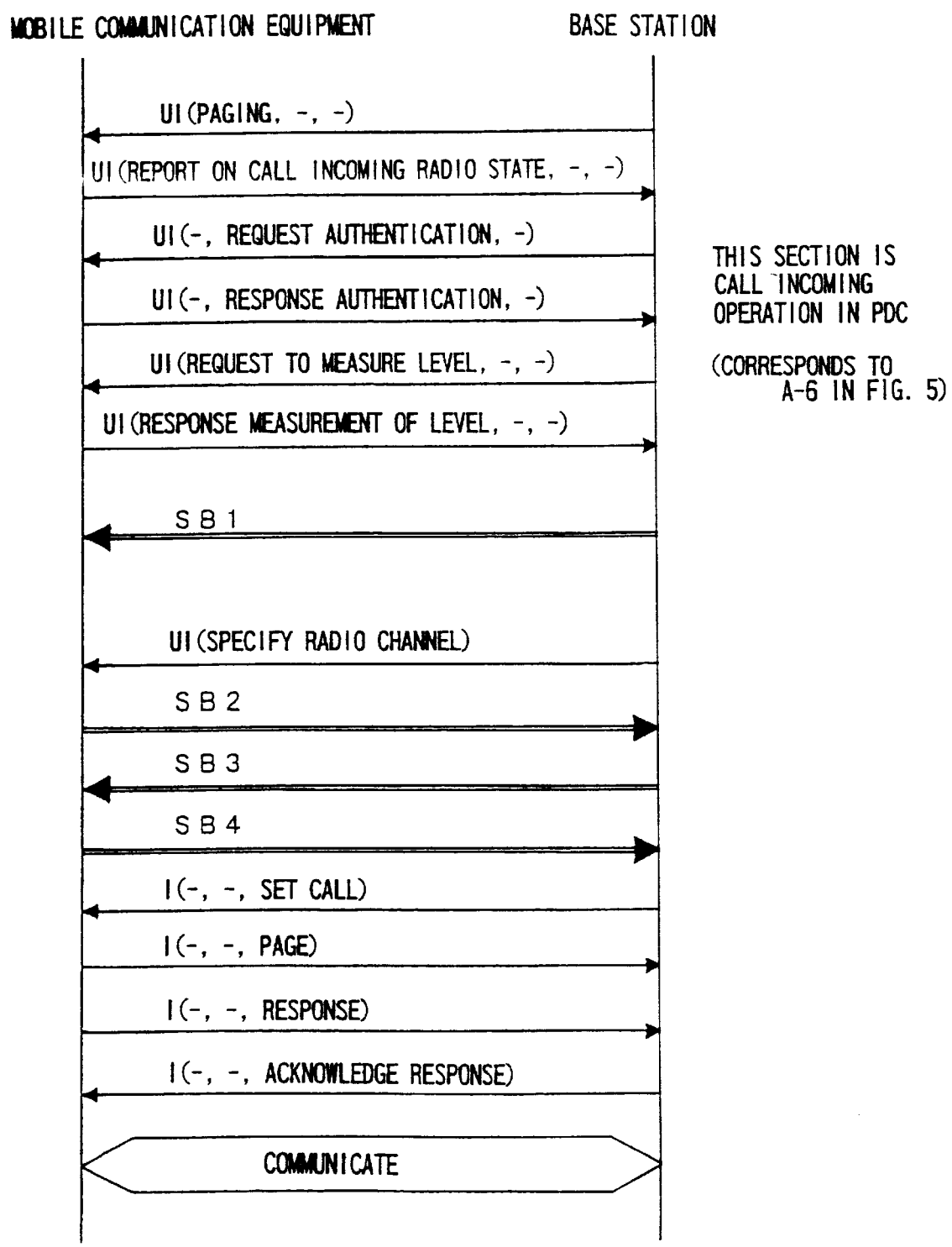
FIG. 8 is a chart showing a control sequence during call incoming in the communication system using the portable telephone 21.

It is noted that the PDC call incoming operation includes steps from UI (Report on call incoming radio state, -, -) which is transmitted from the mobile communication apparatus to the base station to SB4 which is transmitted from the mobile communication apparatus to the base station within the control sequence shown in FIG. 8. In this section, the mobile communication apparatus responses to the call incoming message by transmitting the report on the call incoming radio state by UI (Report on call incoming radio state, -, -) to the base station, is authenticated that it is the normal mobile station by UI (-, Request Authentication, -) transmitted from the base station to the mobile communication apparatus and UI (-, Response Authentication, -) transmitted from the mobile communication apparatus to the base station and measures and reports the level of the field intensity by UI (Request to Measure Level, -, -) transmitted from the base station to the mobile communication apparatus and UI (Response Measurement of Level, -, -) transmitted from the mobile communication apparatus to the base station. Then, the base station specifies a radio channel while sending SB1 through a speech channel. Receiving that, the mobile communication apparatus switches frequency to the specified radio channel, transmits SB2 by synchronizing with the previous SB1 and exchanges SB3 and SB4 with the base station to synchronize in the speech channel. I (-, -, Set Call) transmitted from the base station to the mobile station, I (-, -, Page) and I (-, -, Response) transmitted from the mobile station to the base station and I (-, -, Acknowledge Response) transmitted from the base station to the mobile station are executed in the process during the communication.

(a), (b) and (c) in the storage section 25 of data representing the state transition shown in FIG. 4 indicate the state transitions of [Reject Request and Store Information], [Primarily Hold Request] and [Reject Request Presumed to be Retried], respectively. These state transitions will be explained below.

[Reject Request and Store Information]

When the portable telephone 21 receives the request of "6: Call Incoming in PDC", i.e., when the portable telephone 21 receives UI (RT=paging, MM=-, CC=-) signal from the radio base station as described above, the portable telephone 21 should not transmit responding to the signal even when it coincides with the ID of own station because the PHS transmitting means 6a of the PHS RF section 6 is operative in the states B, C, D and E.

Accordingly, the process for the request of "6: Call Incoming in PDC" (step S3 in FIG. 6) in the states of "B: PHS Location Registration", "D: PHS Location Registration/Waiting for Origination in PDC" and "E: Communicating in PHS" is "Reject" (the contents of processes of B-6, C-6, D-6 and E-6 in FIG. 5) and the portable telephone 21 stores that there has been a call incoming via PDC and pager information contained in the paging signal and maintains the current state without shifting the state (state transitions of B-6, C-6, D-6 and E-6 in FIG. 4). Then, the portable telephone 21 informs the user by indicating on the display section 14 based on the stored information and by creating announcing sound by the voice codec 8 to output from the receiver 9. Information such as a telephone number is included in the call incoming information and displayed to notify from who the call incoming has been made.

Thereby, no transmission by the PDC transmitting means 4a of the PDC RF section 4 (process from UI (Report on Call Incoming Radio State, -, -) in FIG. 8) is carried out, so that no transmission is carried out simultaneously by the PDC transmitting means 4a of the PDC RF section 4 and the PHS transmitting means 6a of the PHS RF section 6, thus allowing the quality of the transmitted radiowaves to be kept high.

It is noted that when the portable telephone 21 receives the request of "3: Call Incoming in PHS", the process for that request is "Reject" (the contents of processes of F-3, G-3, H-3 and I-3 in FIG. 5) in the same manner as described above because the PDC transmitting means 4a of the PDC RF section 4 is operative in the states F, G, H and I. Then, the portable telephone 21 stores that there has been a termiantion via PHS, maintains the current state without shifting the state (state transitions of F-3, G-3, H-3 and I-3 in FIG. 4) and arranges so as not to transmit by the PHS transmitting means 6a of the PHS RF section 6.

When the request of "5: Call Origination in PDC" is made in the state of "E: Communicating in PHS" or the request of "2: Call Origination in PHS" is made in the state of "I: Communicating in PDC", the process for the request is also "Reject" in the same manner as described above. When it is a manipulation for originating a call made by the user, the portable telephone 21 informs the user that it is unusable, maintains the current state without shifting the state and arranges so as not to transmit by the PHS transmitting means 6a and the PDC transmitting means 4a simultaneously.

[Primarily Hold Request]

This process shifts the states in a route indicated by arrows in FIG. 4. While there are two types of lines of a solid line and a broken line, the arrow of the solid line will be explained here.

When the portable telephone 21 receives the request of "5: Call Origination in PDC" in the state of "B: PHS Location Registration", i.e., the user manipulates the input section 17 to originate a call by PDC, the user cannot transmit by using PDC instantly because the PHS transmitting means 6a is operative. If the portable telephone 21 rejects this request, the user must manipulate the input section 17 again to originate a call by PDC. However, the user is not required to originate a call again by originating the call by PDC after registering the PHS location because the transmission for registering the PHS location ends in a short time and the PDC transmitting means 4a may be used instantly.

Accordingly, "D: PHS Location Registration/Waiting for PDC Origination" is set as the current state to wait for the time when the registration of PHS location ends. In case of "B-5", the state is shifted to "D: PHS Location Registration/Waiting for PDC Origination" and the registration of PHS location is ended in the state of "D: PHS Location Registration/Waiting for Origination in PDC". When the request of "7: End of PHS Location Registration" is generated, the PDC call originating process is executed to shift to the state of "I: Communicating in PDC".

Thereby, no transmission is made by the PDC transmitting means 4a while transmitting by the PHS transmitting means 6a, so that no transmission is made by the PDC transmitting means 4a and the PHS transmitting means 6a simultaneously. Then, it is possible to maintain the quality of the transmitted radiowaves high and to eliminate the necessity of another call originating operation made by the user.

It is noted that "G: PDC Location Registration/Waiting for Origination in PHS" is provided as the current state in the same manner and PHS call origination during PDC location registration is shifted to the state of "E: Communicating in PHS" via "F-2" and "G-9".

[Rejection of Request Presumed to be Retried]

When Periodic Location Registration is set, the communication apparatus has a timer and periodically carries out location registration. For instance, when time for location registration comes by this Periodic PDC Location Registration, the request of "4: PDC Location Registraation" is generated within the communication apparatus. At this time, although the portable telephone 21 rejects the process of PDC Location Registration in the states B, C, D and E in which the PHS transmitting means 6a is operative, it is not necessary to store and inform the reject because periodical location registration has been specified, the location registration request is generated per every 100 seconds for example and the retrial is made automatically even when one is rejected.

Thereby, no transmission is made by the PDC transmitting means 4a when transmission is made by the PHS transmitting means 6a, so that no transmission is made simultaneously by the PDC transmitting means 4a and the PHS transmitting means 6a. Therefore, the quality of the transmitting radiowaves may be kept high and the standby state is not held uselessly.

It is noted that the same applies to the case during which transmission is made in PDC (F, G, H and I) to the request of periodical PHS location registration.

Still more, even in the case of [Rejection of Request and Storage of Information] described above, a PDC or PHS call incoming is informed by several times depending on the system of the base station when the request of "6: Call Incoming in PDC" is made in the state of "B: PHS Location Registration" and when the request of "3: Call Incoming in PHS" is made in the state of "F: PDC Location Registration". Even when the termination process is rejected, the retrial is made substantially. When PHS Registration or PDC Registration ends until that time, the state may shift to B, A and I or F, A and E and the response to the call incoming may be made, so that it may be included in the process of [Reject Request Presumed to be Retried].

As described above, the embodiment allows the quality of the transmitting radiowaves to be kept high by controlling so that no transmission is made simultaneously by the PDC transmitting means 4a and the PHS transmitting means 6a in the transition of states.

It is noted that although the embodiment has been arranged so as to execute the above-mentioned operations and controls based on the programs and data stored in the storage section 18 in advance, the invention is not limited to that. For instance, the above-mentioned operations and controls may be executed by storing those programs and data in the storage section 18 by reading from a recording medium or by receiving through a radio circuit or by directly using those programs and data read from the recording medium or received through the radio circuit.

Accordingly, not only the communication apparatus comprising a plurality of different radio transmitter sections realized in the portable telephone 21 as described above but also the transmission control method of that communication apparatus, the medium recording the transmission control program of the communication apparatus and the communication system using that communication apparatus fall within the scope of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication apparatus comprising:

a plurality of radio transmitter sections;

transmission control means for, when one of the plurality of radio transmitter sections is engaged in transmission, rejecting a transmission request which is made to another radio transmitter section of the plurality of radio transmitters which is not engaged in transmission; and first and second antennas, wherein a duplexer is connected to the second antenna but not the first antenna so that first and second of the radio transmitter sections can share the second antenna, but not the first antenna which is only used by the first radio transmitter section.

2. A communication apparatus comprising:

a plurality of radio transmitter sections; and transmission control means for, when specific one among the plurality of radio transmitter sections is engaged in transmission, holding a transmission request which is made to another radio transmitter section thereamong which is not engaged in transmission, and validating the held transmission request when the transmission of the specific radio transmitter section ends so that the held transmission request is automatically processed to originate a corresponding transmission from the communication apparatus when the transmission of the specific radio transmitter section ends so that a user does not have to again have to manipulate an input section of the communication apparatus to actuate the held transmission request.

3. A communication apparatus comprising:

a plurality of radio transmitter sections;

a radio receiving section; and transmission control means for, when specific one among the plurality of radio transmitter sections is engaged in transmission, judging a transmission request which is made to another radio transmitter section thereamong which is not engaged in transmission, whether or not the transmission request is of a signal which is produced based on information repeatedly received by the radio receiving section; rejecting the transmission request when the transmission request is of a signal which is produced based on the received information and holding the transmission request when being not of the signal; and validating the held transmission request when the transmission of the specific radio transmitter section ends so that the held transmission request is automatically processed to originate a corresponding transmission from the communication apparatus when the transmission of the specific radio transmitter section ends so that a user does not have to again have to manipulate an input section of the communication apparatus to actuate the held transmission request.

4. The communication apparatus of claim 3, further comprising: storage means for storing information received by the radio receiving section and/or information related to the received information when the transmission control means rejects the transmission request.

5. A communication system comprising the communication apparatus of claim 4; and further comprising:

an exchange for transmitting a transmission request to the communication apparatus, the communication system using a communication sequence requiring a response from the communication apparatus to the transmission request from the exchange, wherein a message from the exchange of the communication sequence before the response from the communication apparatus contains information regarding a pager.

6. The communication apparatus of claim 3, further comprising: announcing means for announcing information received by the radio receiving section and/or information related to the received information when the transmission control means rejects the transmission request.

7. A computer readable medium on which a computer program for computer control of transmission operation of a communication apparatus comprising a plurality of radio transmitter sections is stored, the computer program comprising:

judging whether or not specific one among the plurality of radio transmitter sections is engaged in transmission;

in the case where the specific transmitter section is engaged in transmission, holding a transmission request which is made to another radio transmitter section thereamong; and validating the held transmission request when the transmission of the specific radio transmitter section ends so that the held transmission request is automatically processed to originate a corresponding transmission from the communication apparatus when the transmission of the specific radio transmitter section ends so that a user does not have to again have to manipulate an input section of the communication apparatus to actuate the held transmission request.

8. A computer readable medium on which a computer program for computer control of transmission operation of a communication apparatus comprising a plurality of radio transmitter sections is stored, the computer program comprising:

judging whether or not specific one among the plurality of radio transmitter sections is engaged in transmission;

in the case where the specific transmitter section is engaged in transmission, judging whether or not a transmission request is of a signal which is produced based on information repeatedly received by the radio receiving section;

in the case where the transmission request is of a signal which is generated based on the received information, rejecting the transmission request, and holding the transmission request when being not of the signal which is generated based on the received information; and validating the held transmission request when the transmission of the specific radio transmitter section ends so that the held transmission request is automatically processed to originate a corresponding transmission from the communication apparatus when the transmission of the specific radio transmitter section ends so that a user does not have to again have to manipulate an input section of the communication apparatus to actuate the held transmission request.

9. The computer program of claim 8, wherein the communication apparatus further comprises storage means, and the control program causes the storage means to store information received by the radio receiving section and/or information related to the received information in the storage means when the transmission request is rejected.

10. The computer program of claim 8, wherein the communication apparatus further comprises announcing means, and the control program causes the announcing means to announce information received by the radio receiving section and/or information related to the received information from the announcing means when the transmission request is rejected.

11. A method of controlling transmission operation of a communication apparatus comprising a plurality of radio transmitter sections, comprising the steps of:

judging whether or not specific one among the plurality of radio transmitter sections is engaged in transmission;

in the case where the specific transmitter section is judged as being engaged in transmission, holding a transmission request which is made to another radio transmitter section thereamong; and validating the held transmission request when the transmission of the specific radio transmitter section ends so that the held transmission request is automatically processed to originate a corresponding transmission from the communication apparatus when the transmission of the specific radio transmitter section ends so that a user does not have to again have to manipulate an input section of the communication apparatus to actuate the held transmission request.

12. A method of controlling transmission operation of a communication apparatus comprising a plurality of radio transmitter sections and a radio receiver section, comprising:

a first judging step of judging whether or not specific one among the plurality of radio transmitter sections is engaged in transmission;

a second judging step of, in the case where the specific transmitter section is judged as being engaged in transmission, judging whether or not a transmission request is of a signal which is produced based on information repeatedly received by the radio receiving section;

a step of, in the case where the transmission request is of a signal which is generated based on the received information, rejecting the transmission request;

a holding step of holding the transmission request when being not of the signal which is generated based on the received information; and a validating step of validating the held transmission request when the transmission of the specific radio transmitter section ends so that the held transmission request is automatically processed to originate a corresponding transmission from the communication apparatus when the transmission of the specific radio transmitter section ends so that a user does not have to again have to manipulate an input section of the communication apparatus to actuate the held transmission request.

13. The method of controlling transmission operation of a communication apparatus of claim 12, wherein the communication apparatus further comprises storage means, the method comprising:

a step of storing information received by the radio receiving section and/or information related to the received information in the storage means after the transmission request rejecting step.

14. The method of controlling transmission operation of a communication apparatus of claim 12, wherein the communication apparatus further comprises announcing means, the method comprising:

a step of announcing information received by the radio receiving section and/or information related to the received information from the announcing means after the transmission request rejecting step.

* * * * *